US008270759B2

(12) United States Patent
El-Mahdy et al.

(10) Patent No.: US 8,270,759 B2

(45) Date of Patent: Sep. 18, 2012

(54) TRANSFORMATION OF A VIDEO IMAGE FROM A HIGH DYNAMIC RANGE IMAGE TO A LOW DYNAMIC RANGE IMAGE

(75) Inventors: Ahmed Hazem Mohamed Rashid El-Mahdy, Alexandria (EG); Hisham ElShishiny, Giza (EG)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 12/139,541

(22) Filed: Jun. 16, 2008

(65) Prior Publication Data

US 2009/0310015 A1 Dec. 17, 2009

(51) Int. Cl.
*G06K 9/36* (2006.01)

(52) U.S. Cl. ........ 382/276; 382/279; 382/199; 382/162; 382/280

(58) Field of Classification Search .................. 382/276, 382/279, 199, 162, 128, 280; 348/441, 607, 348/222.1; 708/420; 345/102, 590, 615
See application file for complete search history.

(56) References Cited

U.S. PATENT DOCUMENTS 5,809,164 A * 9/1998 Hultgren, III ................. 382/162
2003/0002860 A1* 1/2003 Ono et al. ..................... 386/113
2008/0297460 A1* 12/2008 Peng et al. .................... 345/102
2009/0220152 A1 9/2009 Tiwari et al.
2009/0310887 A1 12/2009 El-Mahdy et al.

FOREIGN PATENT DOCUMENTS

EP 0877338 A3 11/1998

OTHER PUBLICATIONS

Goodnight, et al.; Interactive Time-Dependent Tone Mapping Using Programmable Graphics Hardware; Eurographics symposium on Rendering 2003; pp. 1-13.

Spirig, et al.; A Smart CCD Image Sensor with Real-Time Programmable Parallel Convolution Capabilities; IEEE Transactions on Circuits and Systems-I: Fundamental Theory and Applications, vol. 44, No. 5; May 1997; pp. 465-468.

(Continued)

*Primary Examiner* — Ali Bayat

(74) *Attorney, Agent, or Firm* — Schmeiser, Olson & Watts; Jeanine Ray

(57) ABSTRACT

A method and system for transforming a video image from a High Dynamic Range (HDR) image on an array of pixels to a Low Dynamic Range (LDR) image. An old luminance generated from a color space of the HDR image is scaled and segmented into stripes. Each stripe has at least one row of the array. A target zone surrounding a current pixel in each stripe is determined from a search strategy selected from a linear search strategy and a zone history-based search strategy. A convolution of the scaled luminance at a current pixel of each stripe is computed using a kernel specific to the target zone. The convolution is used to convert the stripes to tone-mapped luminance stripes which are collected to form a tone mapped luminance pixel array that is transformed to the color space to form the LDR image. The LDR image is stored and/or displayed.

21 Claims, 11 Drawing Sheets

OTHER PUBLICATIONS

Airtsugi et al.; Several Partitioning Strategies for Parallel Image Convolution in a Network of Heterogeneous Workstations; Parallel computing, vol. 27, Issue 3, 2001; Elsevier Science B.V.; pp. 269-293.

Cypher et al.; SIMD Architectures and Algorithms for Image Processing and Computer Vision; IEEE Transactions on Acoustics, Speech, and Signal Processing, vol. 37, No. 12, Dec. 1989; pp. 2158-2174.

Office Action (Mail Date Sep. 9, 2011) for U.S. Appl. No. 12/140,330; Filing Date Jun. 17, 2008.

Notice of Allowance (Mail Date Dec. 15, 2011) for U.S. Appl. No. 12/140,330; Filing Date Jun. 17, 2008.

Reinhard et al.; Photographic Tone Reproduction for Digital Images; SIGGRAPH '02: Proceedings of the 29th Annual Conference on Computer Graphics and Interactive Techniques; pp. 267-276, New York, NY, USA, ACM Press (2002).

Bader et al.; FFTC: Fastest Fourier Transform for the IBM Cell Broadband Engine; © Springer-Verlag Berlin Heidelberg 2007; pp. 172-184.

The Discrete Fourier Transform; pp. 110-115.

* cited by examiner

TRANSFORMATION OF A VIDEO IMAGE FROM A HIGH DYNAMIC RANGE IMAGE TO A LOW DYNAMIC RANGE IMAGE

FIELD OF THE INVENTION

The present invention provides a method and system for transforming a video image from a High Dynamic Range (HDR) image to a Low Dynamic Range (LDR) image.

BACKGROUND OF THE INVENTION

High dynamic range (HDR) imaging is about representing scenes with values commensurate with real-world light levels. The real world produces a twelve order of magnitude range of light intensity variation, which is much greater than the three orders of magnitude common in current digital imaging. The range of values each pixel can currently represent in a digital image is typically 256 values per color channel (with a maximum of 65536 values), which is inadequate for representing many scenes. It is better to capture scenes with a range of light intensities representative of the scene and range of values matched to the limits of human vision, rather than matched to any display device. Such images are called HDR images. Images suitable for display with current display technology are called Low Dynamic Range (LDR) images. The visual quality of high dynamic range images is much higher than that of conventional low dynamic range images.

HDR images are different from LDR images regarding the capture, storage, processing, and display of such images, and are rapidly gaining wide acceptance in photography. Although HDR display technology will become generally available in the near future, it will take time before most users have made the transition. At the same time, printed media will never become HDR. As a result, there will always be a need to prepare HDR imagery for display on LDR devices. The process of reducing the range of values in an HDR image such that the result becomes displayable in a meaningful way is called dynamic range reduction. Algorithms that prepare HDR images for display on LDR display devices by achieving dynamic range reduction are called tone reproduction or simply tone-mapping operators. Therefore, tone mapping converts HDR images into an 8-bit representation suitable for rendering on LDR displays. It reduces the dynamic range of the image while preserving a good contrast level for the brightly and darkly illuminated regions.

Professional or consumer digital photography devices, equipped with commodity processors, that can capture and process HDR images will be the norm in the near future. HDR sensors already exists; e.g., Fraunhofer-Institut Milkroelelronische Schaltungen und Systeme. CMOS image sensor with 118 dB linear dynamic input range Data Sheet. A major requirement for such devices will be the ability to perform dynamic range reduction through tone mapping, in real time or near real time. Photographic quality tone-mapping, which is a local adaptive operation, requires intensive computation that cannot be processed in real time (or near real time) on digital photographic devices unless such computation is performed efficiently on a powerful commodity processor. Therefore, an efficient technique that can perform tone mapping for real time (or near real time) HDR video and interactive still photography, using a commodity processor on digital photographic devices, is needed.

Currently there exist some HDR photographic quality tone mapping local operators. The most known operator for its high photographic quality is Reinhard et al. photographic tone mapping operator (Erik Reinhard, Michael Stark, Peter Shirley, and James Ferwerda. Photographic tone reproduction for digital images, SIGGRAPH '02: Proceedings of the 29th annual conference on Computer graphics and interactive techniques, pages 267-276, New York, N.Y., USA, 2002. ACM Press), which is a local adaptive operator incorporating the classical Ansel Adams dodging-and-burning technique (Ansel Adams, The Print, The Ansel Adams Photography Series/Book 3, Little, Brown and Company, tenth edition, 2003, with the collaboration of Robert Balker), that is based on common photographic principles, to tone map each individual pixel of the HDR image. This local tone mapping operator, like the other currently available local operators, runs only offline on workstations, as local operators require huge computation.

SUMMARY OF THE INVENTION

The present invention an efficient technique for performing tone mapping for High dynamic range (HDR) images.

The present invention allows for real time SDTV and near real time HDTV HDR video for the first time on heterogeneous multi-core commodity processors The present invention allows for interactive still photography for the consumer, pro-sumer and professional market.

The present invention has memory requirements that are less than half of the memory requirements for existing implementations, rendering embedded HDR feasible.

The present invention significantly improves the speed of photographic quality tone mapping even on single core processors (such as x86 and PowerPC processors) used for different HDR applications.

The present invention allows the tone mapping performance to be largely independent of the maximum number of zones considered, which potentially allows for higher quality tone mapping.

DETAILED DESCRIPTION OF THE INVENTION

The present invention provides a method and system for transforming a video image from a High Dynamic Range (HDR) image to a Low Dynamic Range (LDR) image. In one embodiment, a real time video stream comprising the video image may be processed by the present invention.

The present invention provides a new real-time/near real-time tone mapping operator suitable for interactive speed embedded applications on heterogeneous multi-core commodity processors such as the Cell BE microprocessor (IBM, Cell Broadband Engine Architecture, October 2006. Version 1.01) which is a low-power, heterogeneous multi-core design. The Cell has one PowerPC processor element (PPE) and 8 synergistic processing elements (SPE). Each SPE has a local memory (software managed), advanced Direct Memory Management (DMA) capabilities, and optimized for stream processing. The processor trades-off hardware speed and low-power with programming complexity. The Cell also comes on a Blade configuration with two Cell processors. The Cell is a commodity processor suitable for embedded applications requiring high processing power. While the embodiments of the present invention are described in terms of SPE processing elements, the scope of the present invention includes processors of any type that can be used for performing digital computations and associated logic.

Starting from Reinhard et al's photographic tone mapping operator, the present invention provides a novel interactive speed photographic quality tone mapping operator suitable for embedded applications. Reinhard's tone mapping operator requires computing a variable number of convolutions at each image pixel, depending on local contrast, which demands high computation power and which makes it not suitable for interactive speed applications. However, it achieves high dynamic range reduction and high photographic quality results.

The present invention is based on selectively computing the required convolutions for each pixel which makes the tone mapping operator significantly faster and suitable for interactive speed photographic quality embedded applications. The inventive system and methods involves an extremely fast search for zones, has high quality, and employs efficient memory management.

Figure 1:
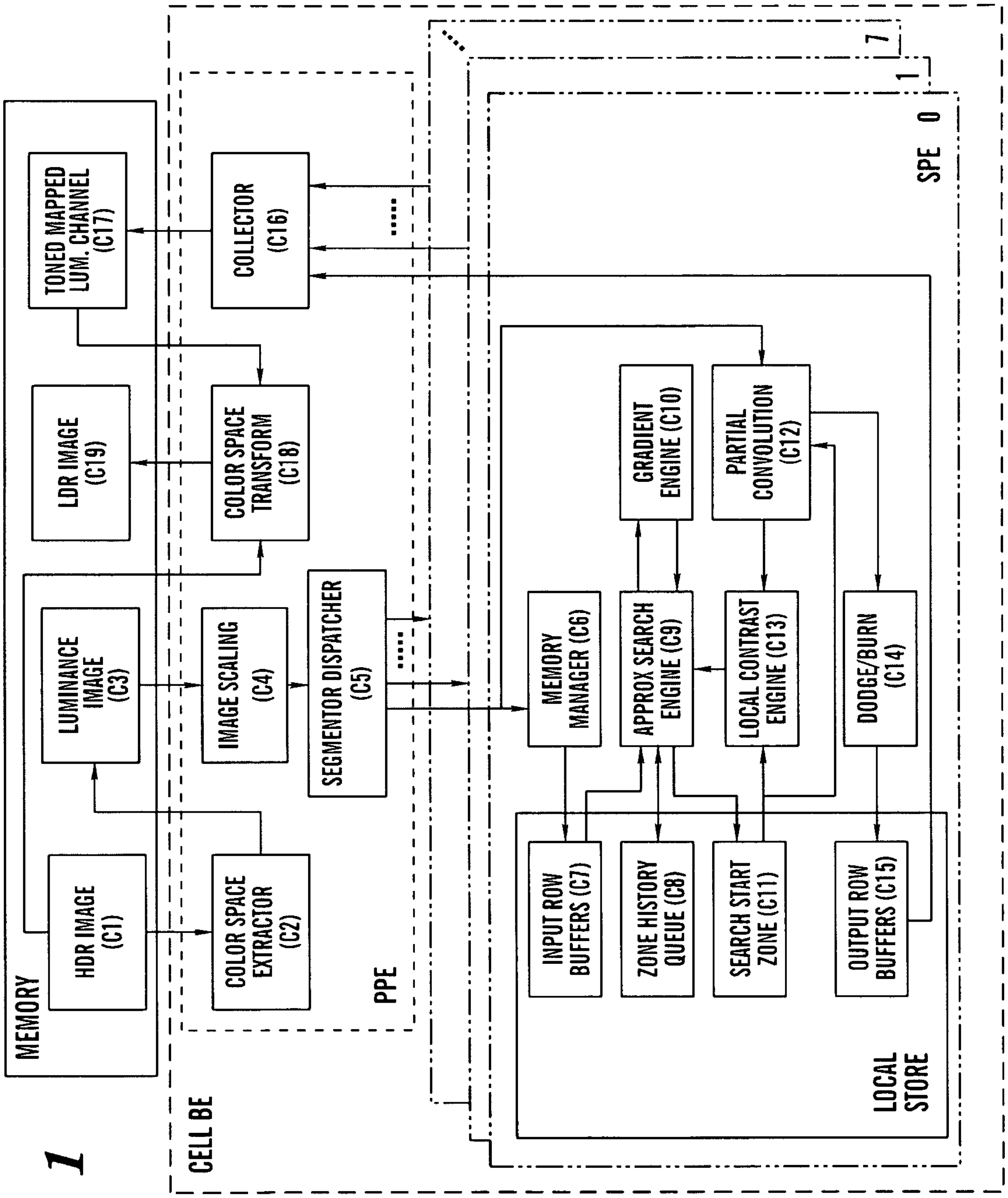
FIG. 1 is a system block diagram for generating a Low Dynamic Range (LDR) image from a High Dynamic Range (HDR) image, in accordance with embodiments of the present invention.

FIG. 1 is a system block diagram for generating a Low Dynamic Range (LDR) image from a High Dynamic Range (HDR) image, in accordance with embodiments of the present invention. FIG. 1 shows data flow among system components, wherein each component is label by a name that starts with the character 'C' and followed by a number. Said system components and the associated data flow will be referred to infra through use of the notation C1, C2, . . . , C19.

Figure 2:
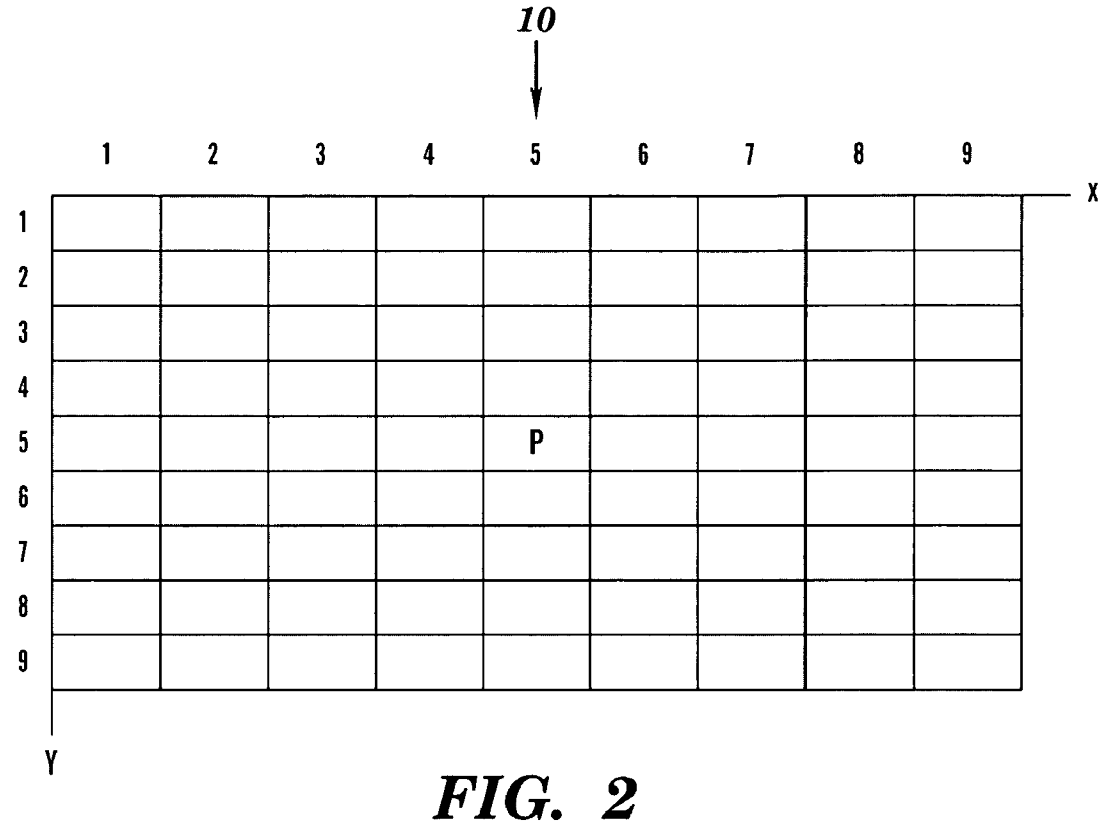
FIG. 2 is a pixel array in which the HDR image and the LDR image are represented, in accordance with embodiments of the present invention.

FIG. 2 is a pixel array 10 in which the HDR image and the LDR image are represented, in accordance with embodiments of the present invention. The pixel array 10 is an array of pixels comprising rows and columns of pixels. The rows are oriented in the X direction and stacked in the Y direction. The columns are oriented in the Y direction and stacked in the X direction. The total number of columns and the total number of rows of the pixel array are denoted as NX and NY, respectively. Thus the column numbers of the pixel array are 1, 2, . . . , NX and the row numbers of the pixel array are 1, 2, . . . , NY. NX and NY are each at least 5. In FIG. 2, NX=NY=9, and the pixel array 10 comprises 81 pixels.

Each pixel (P) in the pixel array 10 is at or near a center of each square of N squares, wherein each square i has a side of length $L_i$ measured in pixels, and wherein $L_i$ is a monotonically increasing function of i (i=0, 1, 2, . . . , N−1) subject to $L_i \geqq 3$. A zone is associated with each square and comprises the square's index i. Thus zone i is associated with square i (i=1, 2, . . . , N−1). The index i of zone i serves to identify a two-dimensional convolution kernel $k_i(x,y)$ relative to the pixel P, wherein the kernel $k_i(x,y)$ is mapped onto the square of zone i as discussed infra.

In one embodiment, $L_i$=ceiling(2*$(1.6)^i$+1), wherein the function ceiling(z) returns the smallest integer greater than or equal to z. Thus for N=8, the square in this embodiment has the following sides: $L_0=3$, $L_1=5$, $L_2=7$, $L_3=10$, $L_4=15$, $L_5=22$, $L_6=36$, $L_7=55$.

In one embodiment, $L_i=2i+1$. In this embodiment, $L_i$ is an odd integer for all i.

In one embodiment, $L_i=2i+2$. In this embodiment, $L_i$ is an even integer for all i.

If i is an odd integer, then the pixel P is at the geometric center of square i and there are $(L_i-1)/2$ pixels of the square the left, right, top, and bottom of the pixel P. There are $(L_i)^2$ pixels in the square of zone i If i is an even integer, then the pixel P is offset from the geometric center of square i by one pixel in each of the four embodiments shown in Table 1.

TABLE 1

| Embodiment | No. of Pixels To Left of P | No. of Pixels To Right of P | No. of Pixels on Top of P | No. of Pixels on Bottom of P |
|---|---|---|---|---|
| 1 | $(L_i/2) - 1$ | $L_i/2$ | $(L_i/2) - 1$ | $L_i/2$ |
| 2 | $(L_i/2) - 1$ | $L_i/2$ | $L_i/2$ | $(L_i/2) - 1$ |
| 3 | $L_i/2$ | $(L_i/2) - 1$ | $(L_i/2) - 1$ | $L_i/2$ |
| 4 | $L_i/2$ | $(L_i/2) - 1$ | $L_i/2$ | $(L_i/2) - 1$ |

Figure 3:
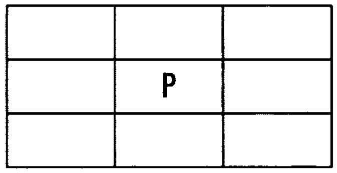
FIGS. 3 and 4 depict illustrative pixel zones with respect to a pixel of the pixel array of FIG. 2, in accordance with embodiments of the present invention.
Figure 4:
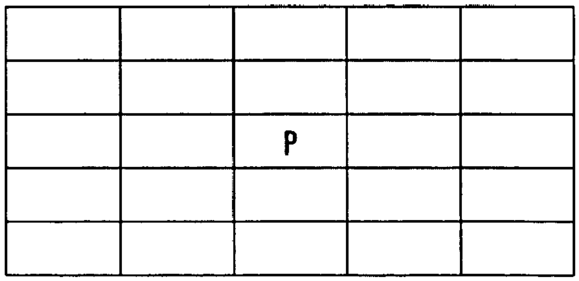

FIGS. 3 and 4 depict illustrative zones with respect to the pixel P of the pixel array 10 of FIG. 2, in accordance with embodiments of the present invention. The zone in FIG. 3 is zone 0 (i.e., i=0) with respect to the pixel P and the square of the zone consists of 9 pixels. The zone in FIG. 4 is zone 1 (i.e., i=1) with respect to the pixel P and the square of the zone consists of 25 pixels. Generally, the square of zone i consists of $(L_i)^2$ pixels. Thus, zones 2 and 3 consist of 49 and 81 pixels, respectively. The pixel P is disposed at the exact geometrical center of the square of pixels of the zones in FIGS. 3 and 4, since i is an odd integer in FIGS. 3 and 4.

Figure 5:
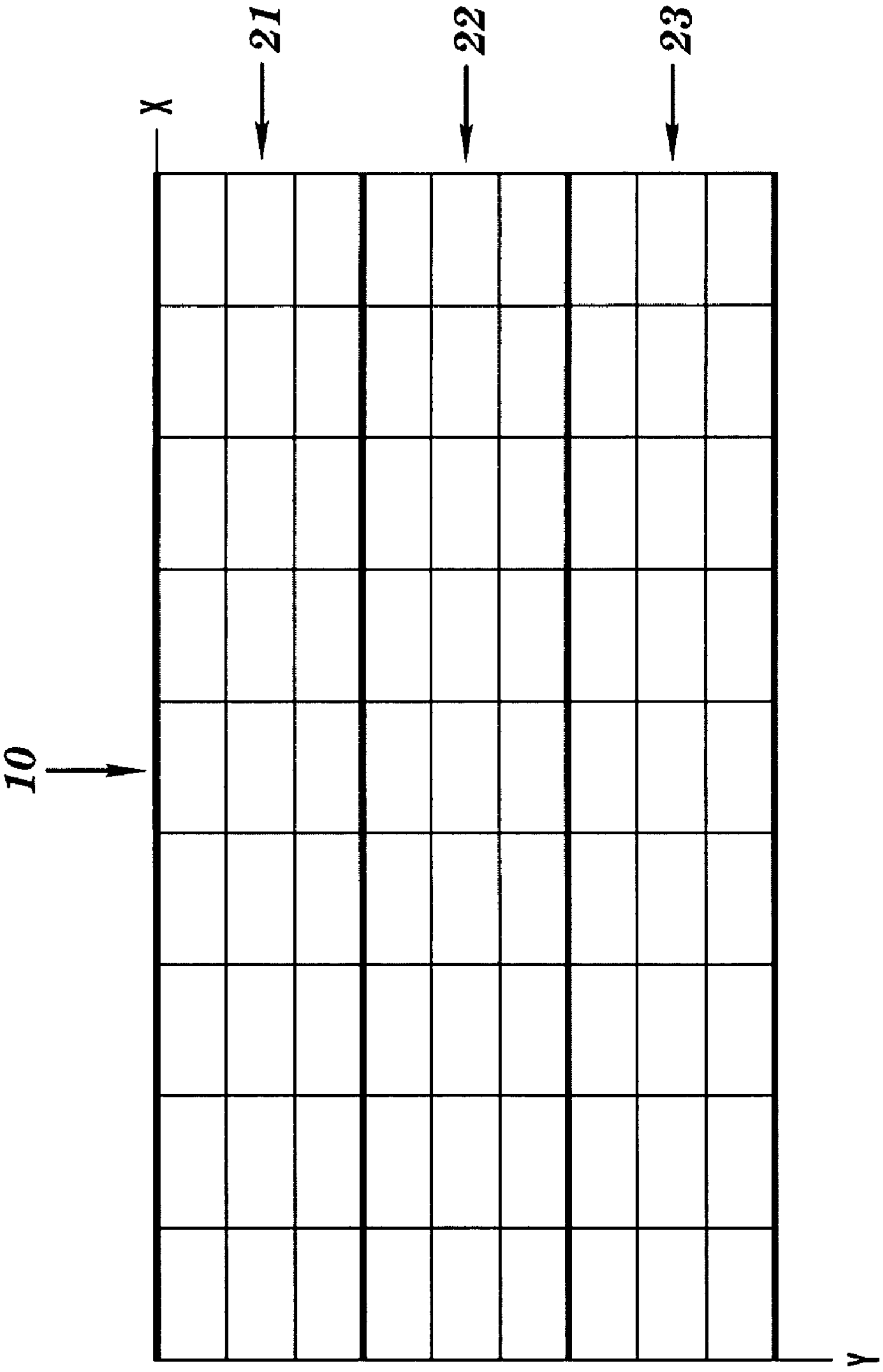
FIG. 5 depicts the pixel array of FIG. 2 segmented into horizontal stripes, in accordance with embodiments of the present invention.

FIG. 5 depicts the pixel array 10 of FIG. 1 segmented into horizontal stripes 21, 22, and 23, in accordance with embodiments of the present invention. A horizontal stripe consists of one row or a contiguous sequence of rows of the pixel array 10.

Figure 6:
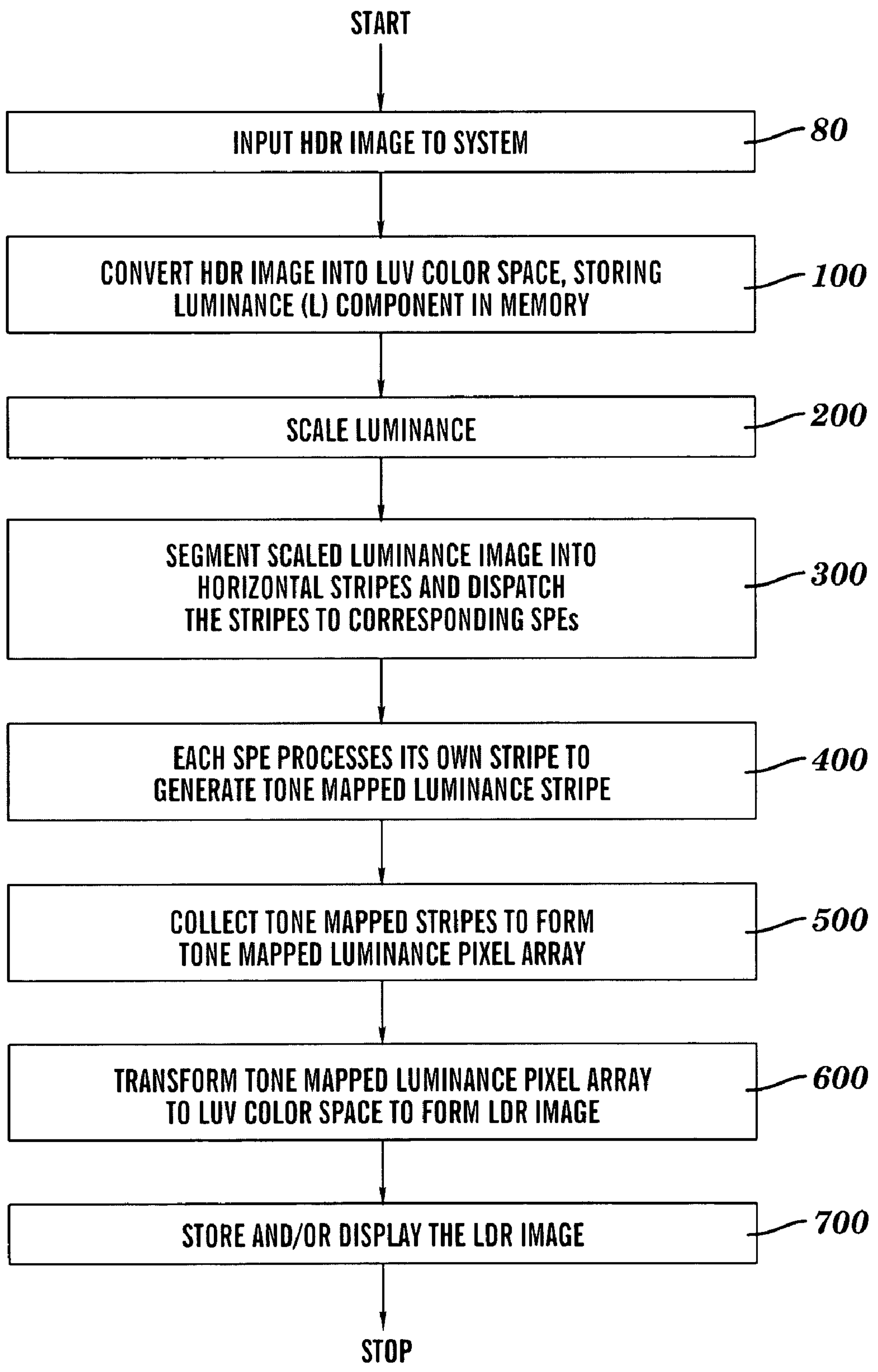
FIG. 6 is a high-level flow chart describing generation of a Low Dynamic Range (LDR) image from a High Dynamic Range (HDR) image, in accordance with embodiments of the present invention.

FIG. 6 is a high-level flow chart describing generation of a Low Dynamic Range (LDR) image from a High Dynamic Range (HDR) image, in accordance with embodiments of the present invention.

Step 80 inputs an HDR image to the system of FIG. 1 and stores the HDR image in memory (C1) within the Cell BE's memory. Such an HDR image could be represented in a variety of color spaces. A standard color space is the RGB space in which the color of each pixel is represented by three components, namely Red (R), Green (G), and Blue (B). Another color space is Luv, wherein L is the luminance component, and u and v are each a chrominance component. Tone mapping operates on the luminance channel.

In step 100, a color space converter (C2) converts the HDR image (C1) into a Luv color space, storing the luminance (L) component in memory (C3). The stored luminance is an old luminance $l_{old}(x,y)$ generated from the HDR image on the array of pixels, wherein x and y are pixel indexes (1, 2, . . . , NX) and (1, 2, . . . , NY) in the X and Y directions, respectively, relative to the origin pixel (0, 0) of the pixel array 10 in FIG. 1.

In step 200, a scaling component (C4) scales each old luminance value $l_{old}(x,y)$ by parameters $\alpha$ and $l_{imag}$ to generate a scaled luminance value l(x,y) according to:

$$l(x,y)=\alpha l_{old}(x,y)/l_{image}$$

wherein $l_{image}$ is a geometric luminance of the whole image. The parameter $\alpha$ specifies a target average luminance for the image. In one embodiment, $\alpha$ is a stored constant or is hard-coded in software that implements the present invention. In one embodiment, $\alpha$ is input provided by a user.

In step 300, the segmentor/dispatcher (C5) segments the scaled luminance image into S horizontal stripes subject to $1 \leqq S \leqq NY$ and dispatches each stripe to a corresponding SPE. In one embodiment, S=1. In one embodiment, 1<S<NY. In one embodiment, S=NY.

In step 400, each SPE processes the pixels in its own stripe to generate a tone mapped luminance stripe, as described infra in FIG. 7-12. In one embodiment in which S>1, the stripes are processed by the respective SPEs in parallel, which exploits computation intensive processing in step 400. Generally, the number of rows may differ in different stripes. In one embodiment in which S>1, each stripe comprises about a same number of rows, which optimizes the processing efficiency due to parallel processing (i.e., simultaneous processing) of the S stripes by the S respective SPEs in step 400. "About a same number of rows" means that the number of rows in each stripe of the S stripes cannot differ by more than 1 row from the number of rows in any stripe of the S stripes.

Although each SPE processes the pixels in its own stripe, pixels sufficiently close to the lower and upper boundaries of a stripe will be surrounded by zones which extend into adjacent neighbor stripes.

As an example, FIG. 5 depicts 3 rows in each stripe of stripes 21, 22, and 23.

In step 500, the S tone-mapped luminance stripes are collected (C16) from the S corresponding SPEs and form a tone mapped luminance pixel array (C17).

In step 600, the colored tone mapped LDR image is generated (C18) from the tone mapped luminance pixel array formed in step 500. In particular, the PPE collects the tone mapped luminance values, transforms the mapped luminance pixel array into the Luv color space characterized by the u and v chrominance components to form the LDR image.

Step 700 stores the LDR image (C19) at main memory or other computer readable storage and/or displays the LDR image.

FIGS. 7-12 describe the logic and computations of step 400 in detail.

Figure 7:
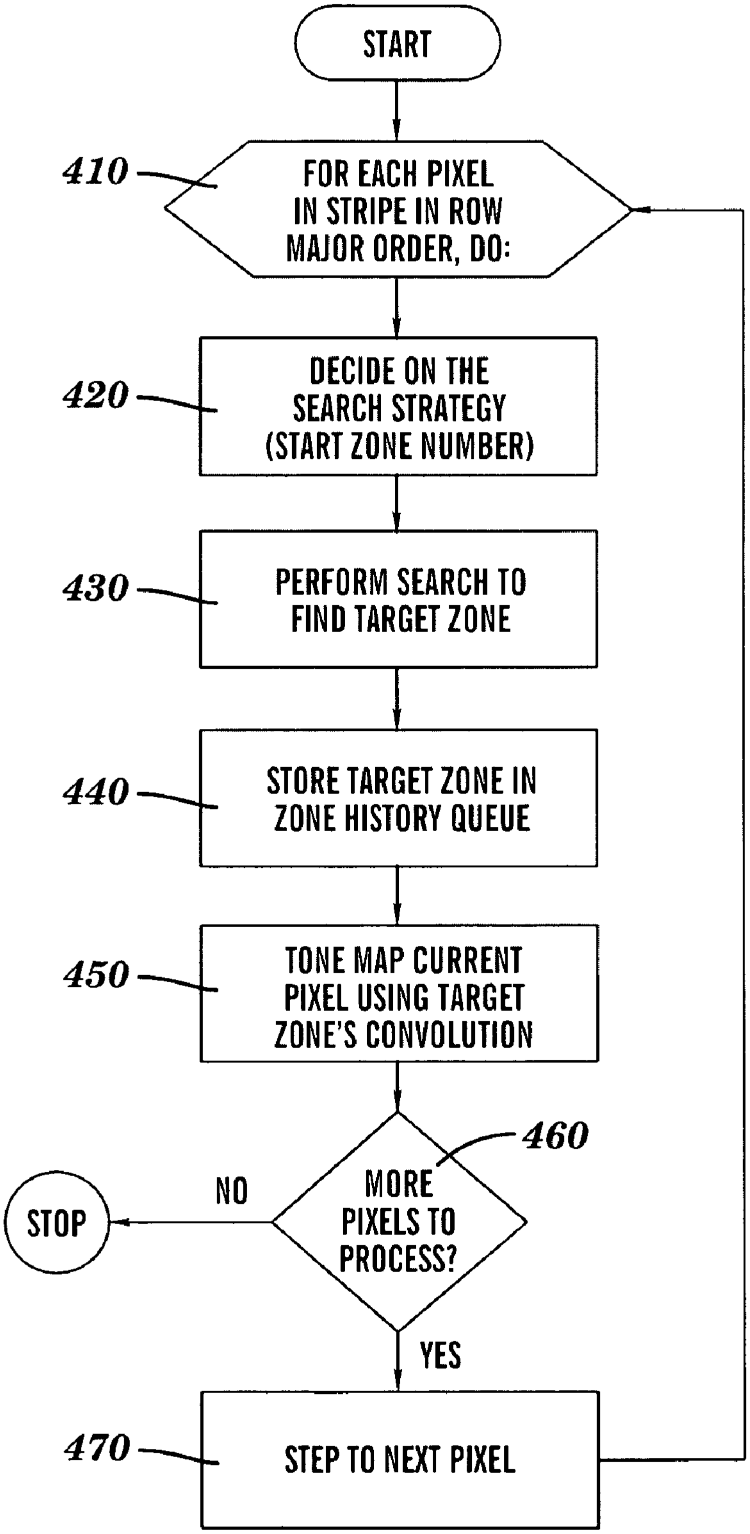
FIG. 7 is a flow chart describing how a stripe is tone mapped, in accordance with embodiments of the present invention.

FIG. 7 is a flow chart describing how a stripe is tone mapped, in accordance with embodiments of the present invention.

In FIG. 7, step 410 initiates a loop for performing a next iteration for a next pixel in the stripe. The next pixel is the first pixel of the stripe for the first instance of executing step 410 for the stripe. The next pixel is the current pixel P(x,y). The iterations traverse the entire SPE's stripe in row major order, which is a one-dimensional technique of accessing successive pixels in a row and wrapping around the end of one row of pixels to the next row of pixels until all pixels in the stripe have been processed.

The luminance values l(x,y) in each row of the stripe are stored in one buffer of a plurality of input row buffers (C7). In one embodiment, the plurality of input row buffers consist of at least 3 buffers. In one embodiment which will be used herein for illustrative purposes only, the plurality of input row buffers consist of 4 buffers, denoted as buffers 0, 1, 2, and 3. Each buffer holds an entire row of luminances belonging to the SPE's stripe.

Initially, the Memory Manager (C6) loads consecutive rows 1, 2, and 3 into buffers 0, 1, and 2, respectively. Whenever a row of luminances is processed, the Memory Manager (C6) loads one new row into the next available buffer, in a circular order. For example, if the current row number is I ($I \geqq 1$), and the buffers are numbered as 0, 1, 2, and 3, the Memory Manager stores the new row (numbered I+2) into buffer number (I+2) mod 4. This technique of filling the buffers in circular order decouples the filling and the use of the buffers among subsequent steps in the processing of the stripe.

Steps 420, 430, and 440 collectively determine a target zone Z(x,y) to be used in step 450 to tone map the current pixel P(x,y) being processed. For a given zone selected from the target zone and other zones with respect to the current pixel P(x,y), the algorithms of the present compute a weighted local average of luminance for the current pixel P(x,y) with respect to the luminance at the pixels in the given zone.

In step 420, the SPE selects a search strategy T(x,y) which will be used to determine a start zone number to begin a zone search to find a target zone Z(x,y) for the current pixel P(x,y). The search strategy T(x,y) is either a linear search strategy or a zone history-based search strategy. The linear search strategy performs a full linear search using zone 0 as the start search zone. The zone history-based search strategy sets the start search zone to a same zone appearing consecutively in the zone history queue for adjacent pixels as described in conjunction with FIG. 8.

The zone search operation requires significant number of computations. Therefore, step 420 seeks to eliminate most of the computations by avoiding a linear search and instead performing a more limited search in much fewer search steps, by making use of differences in luminance between zones whose zone numbers differ by 1.

The decision of which zone strategy to select is based on two aspects. The first aspect is whether or not there is an abrupt luminance change around the current pixel as determined through use of the gradient engine (C10). The second aspect is: even when there is no abrupt luminance change, there is still a chance that zones numbers behave unexpectedly for unforeseen reasons. Therefore, to increase the accuracy of the search strategy decision, the approximate search engine (C9) uses a machine learning approach. Through a zone history queue (C8) (which is a queue that records past zones), the approximate search engine examines the last three computed zones. A 'fast search' strategy is triggered if the last three computed zones are identical, which indicates that the zone behavior is stable and constant.

Figure 8:
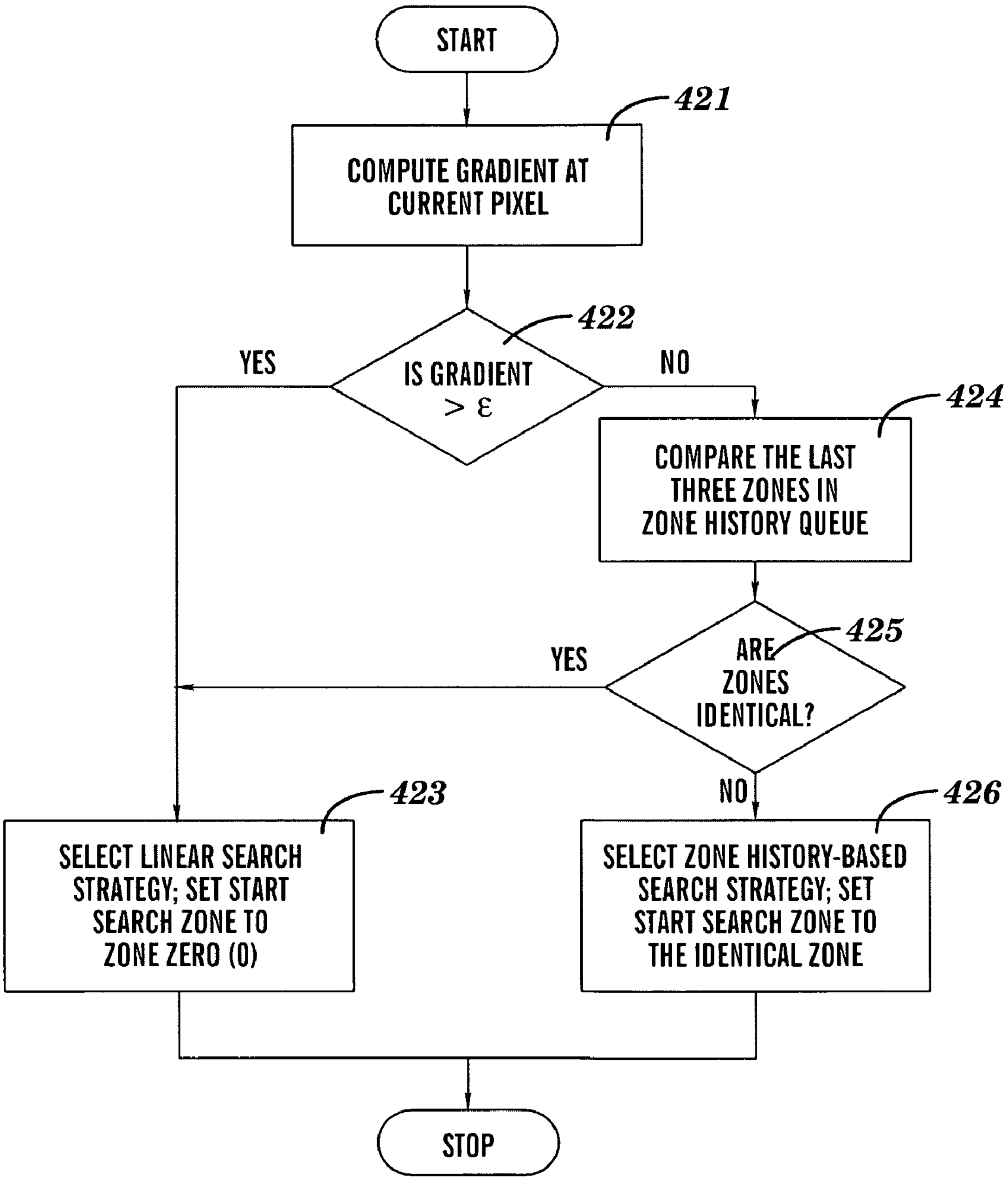
FIG. 8 is a flow chart depicting an algorithm for deciding which search strategy to use to determine a start zone to begin a zone search to find a target zone, in accordance with embodiments of the present invention.

FIG. 8 describes step 420 in detail.

Step 430 finds the target zone by performing the zone search using the start zone determined in step 420. Step 430 utilizes the Search Zone Start (C11). FIGS. 9-12 describe step 430 in detail.

Step 440 stores the target zone found in step 430 in the zone history queue. The zone history queue is used in step 420 to decide on a search strategy.

Step 450 tone maps the current pixel P(x,y), by using the dodge/burn component (C14) to lightens or darken the luminance l(x,y) value accordingly. Such tone mapping is achieved by using the following formula for generating a tone mapped pixel luminance l'(x,y) in terms of the scaled pixel luminance l(x,y):

$$l'(x, y) = \frac{l(x, y)}{1 + V_{zone}(x, y)}$$

wherein $V_{zone}(x,y)$ is a convolution of the scaled luminance l(x,y) at the current pixel P(x,y), using a convolution kernel $k_{zone}(x,y)$ of the target zone Z(x,y) determined in step 430. The convolution $V_{zone}(x,y)$ at the current pixel P(x,y) is computed by the partial convolution engine (C12).

After the luminance is further scaled, the further scaled luminance is stored in the current output row buffer. In one embodiment, there is one standard double-buffered luminance output buffer (C15) to allow for overlapped communication and computation.

Step 460 determines if there is one or more pixels in the stripe to process. If step 460 determines that there is one or more pixels in the stripe to process, then step 470 steps to the next pixel in the row major order processing, followed by looping back to step 410 to begin the next iteration for the next pixel. If step 460 determines that there are no more pixels in the stripe to process, then the process of FIG. 7 stops and the entire LDR image has been generated by the tone mapping operation in step 450 applied to all of the pixels in the HDR image.

FIG. 8 is a flow chart depicting an algorithm for deciding which search strategy to select to determine a start zone to begin a zone search to find the target zone for current pixel P(x,y), in accordance with embodiments of the present invention. FIG. 8 provides a detailed description of step 420 of FIG. 7.

In step 421, the Approximate Search Engine (C9) reads the luminances at four pixels P1, P2, P3, and P4 and feeds these luminances to the Gradient Engine (C10). For the pixel coordinates (x, y) of the current pixel P(x,y), P1 is at (x−1,y), P2 is at (x+1,y), P3 is at (x,y−1), and P4 is at (x, y+1). The luminance values of P3, (P1 and P2), and P4 at are read from buffers number (y−1) mod 4, y mod 4, and (y+1) mod 4, respectively. The Gradient Engine (C10) computes a parameter (G) at the current pixel P(x,y) using the following formula:

$$G = \sqrt{(l(x+1, y) - l(x-1, y))^2 + (l(x, y+1) - l(x, y-1))^2}$$

at the the current pixel P(x,y), wherein l(x,y) is the luminance at current pixel. The parameter G is proportional to a gradient (mathematically) of the luminance at the current pixel P(x,y) and is referred to as a "gradient" for convenience. If y is one of the integers 2, 6, 10, . . . , then l(x,y−1) at P3 is obtained from row buffer 1, l(x+1,y) at P2 and l(x−1,y) at P1 are obtained from row buffer 2, and l(x,y+1) at P4 is obtained from row buffer 3.

Step 422 compares the gradient G with a gradient threshold ϵ. If step 422 determines that the gradient G exceeds the gradient threshold ϵ, then step 423 is next executed. If step 422 determines that the gradient G does not exceed the gradient threshold ϵ, the step 424 is next executed.

In step 424, the last three zones in the zone history queue are compared with one another. The last three zones in the zone history queue are respectively associated with the last three pixels processed in the row major order. Initially prior to processing the first pixel in the row major order, the last three zones in the zone history queue are set to 0, 0, 0.

Based on the comparison in step 424, step 425 determines whether the last three zones in the zone history queue are identical. If step 425 determines that the last three zones in the zone history queue are identical (i.e., are an identical zone) then step 426 is next executed. If step 425 determines that the last three zones in the zone history queue are not identical, then step 423 is next executed.

Although the preceding discussion for steps 424 and 425 analyzed the last three zones in the zone history queue, the present invention generally analyzes last M zones in the zone history queue subject to M≧3.

Step 426 sets the start search zone to the identical zone determined in step 425 and then the process of FIG. 8 stops.

Step 423 sets the start search zone to zero (0), which initiates full linear search. Then the process of FIG. 8 stops.

Figure 9:
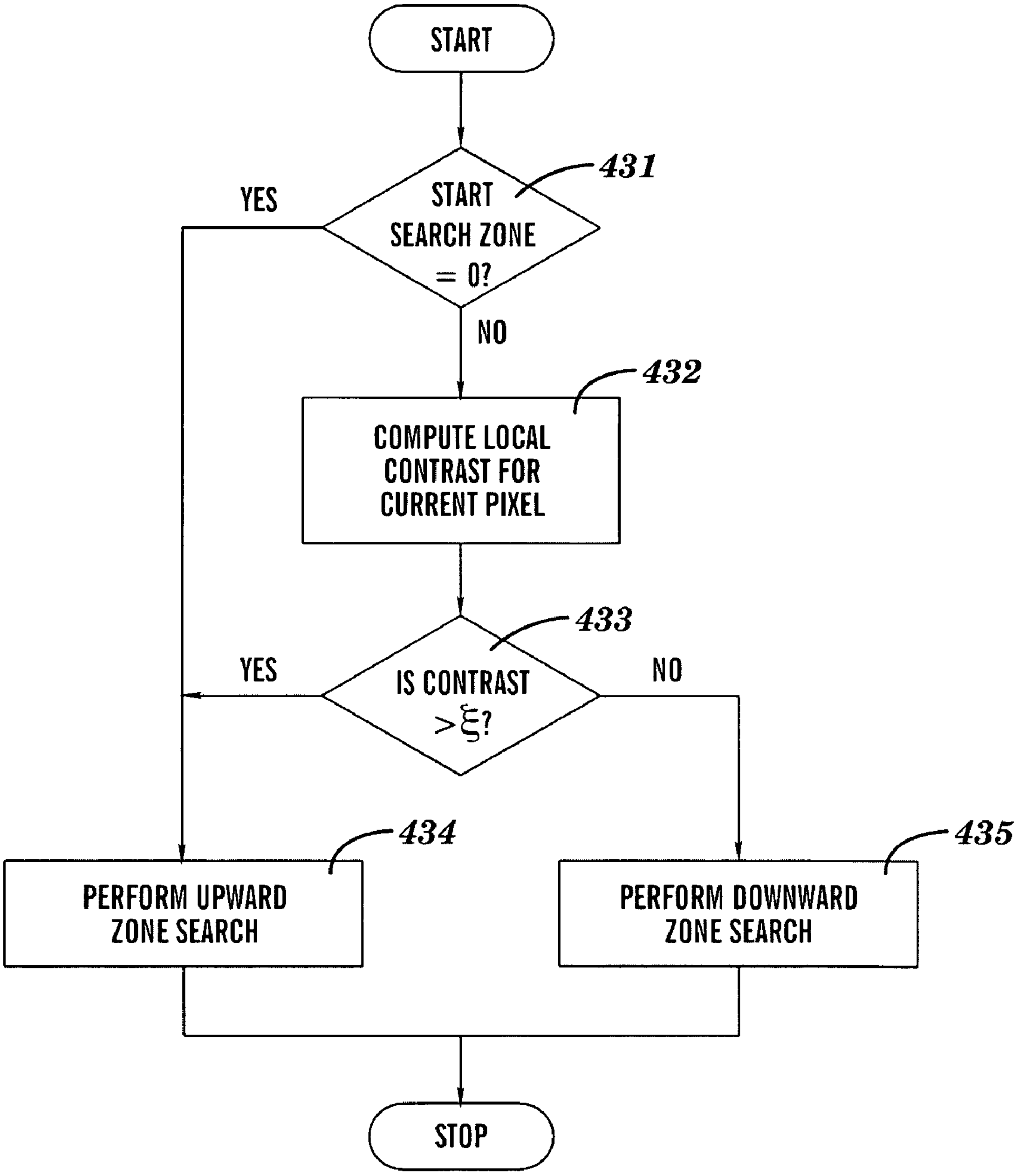
FIG. 9 is a flow chart of an algorithm that implements finding the target zone by performing the zone search using the start search zone, in accordance with embodiments of the present invention.

FIG. 9 is a flow chart of an algorithm that implements step 430 of FIG. 7 for finding the target zone by performing the zone search using the start search zone determined in step 420, in accordance with embodiments of the present invention.

Step 431 determines if the start search zone is zero (0). If step 431 determines that the start search zone is zero, then step 434 is next executed. If step 431 determines that the start search zone is not zero, then step 432 is next executed.

Figure 10:
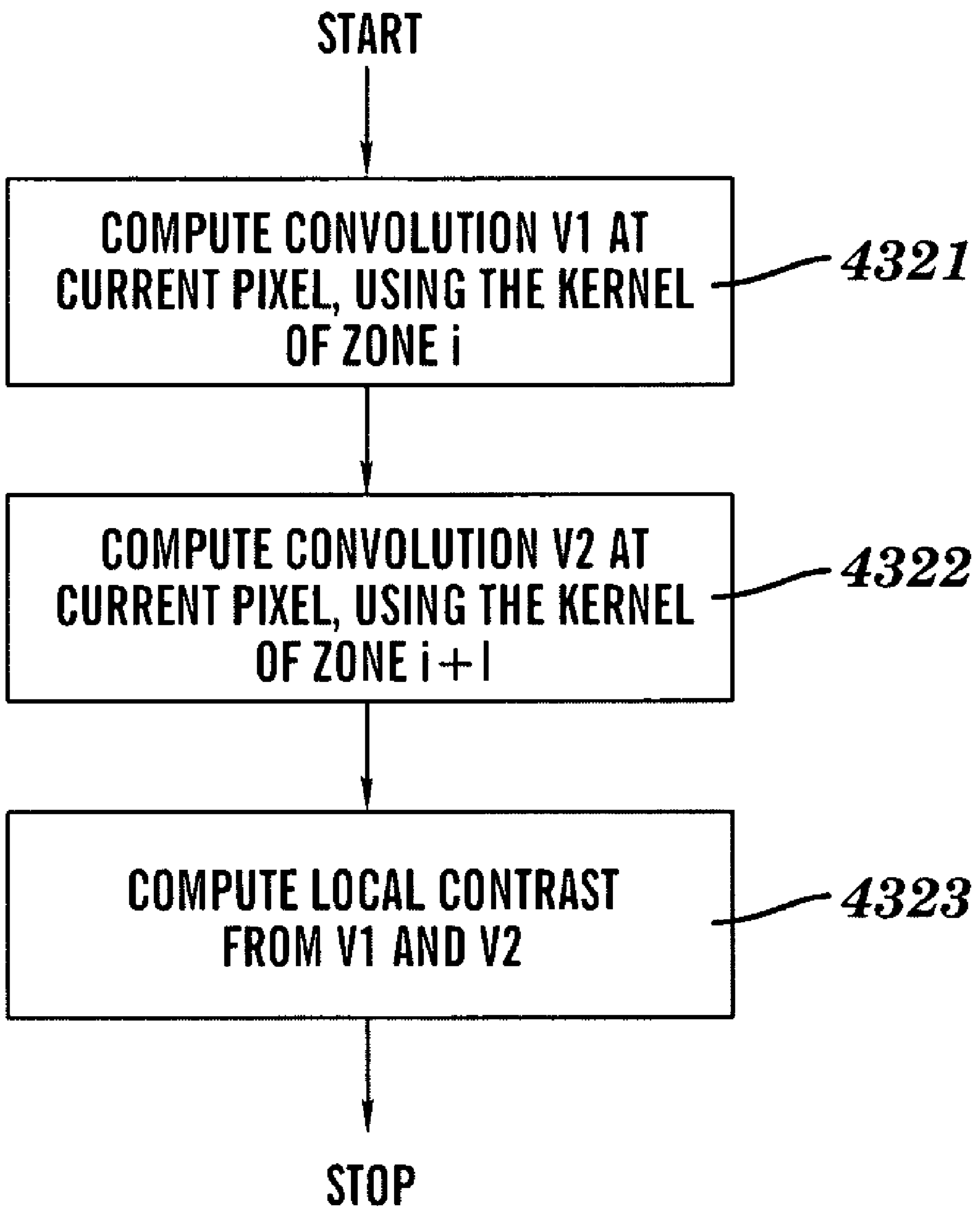
FIG. 10 computes a local contrast at the current pixel, in accordance with embodiments of the present invention.

Step 432 computes local contrast δ(x,y) at the current pixel P(x,y) using the start search zone, as described in detail in FIG. 10. Step 432 utilizes the Local Contrast Engine (C13), Step 433 determines if the local contrast δ(x,y) exceeds a specified threshold ξ. If step 433 determines that the local contrast δ(x,y) exceeds the threshold ξ, then step 434 is next executed. If step 433 determines that the local contrast δ(x,y) does not exceed the threshold ξ, then step 435 is next executed.

Figure 11:
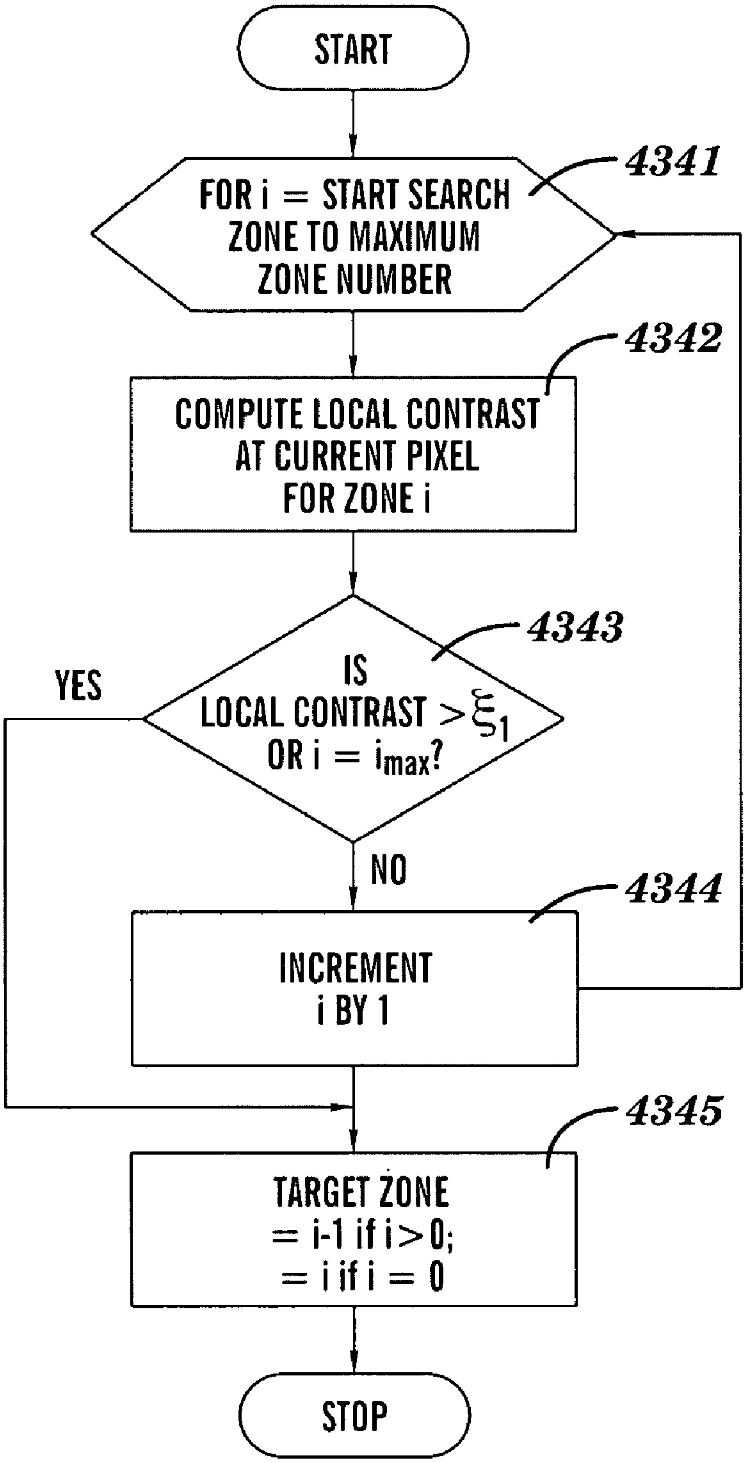
FIG. 11 is a flow chart of a process for finding the target zone by performing an upward zone search using the start search zone, in accordance with embodiments of the present invention.

Step 434 performs an upward zone search which iteratively increments the search zone by one (1) until a stopping criterion is satisfied, as described in detail in FIG. 11.

Figure 12:
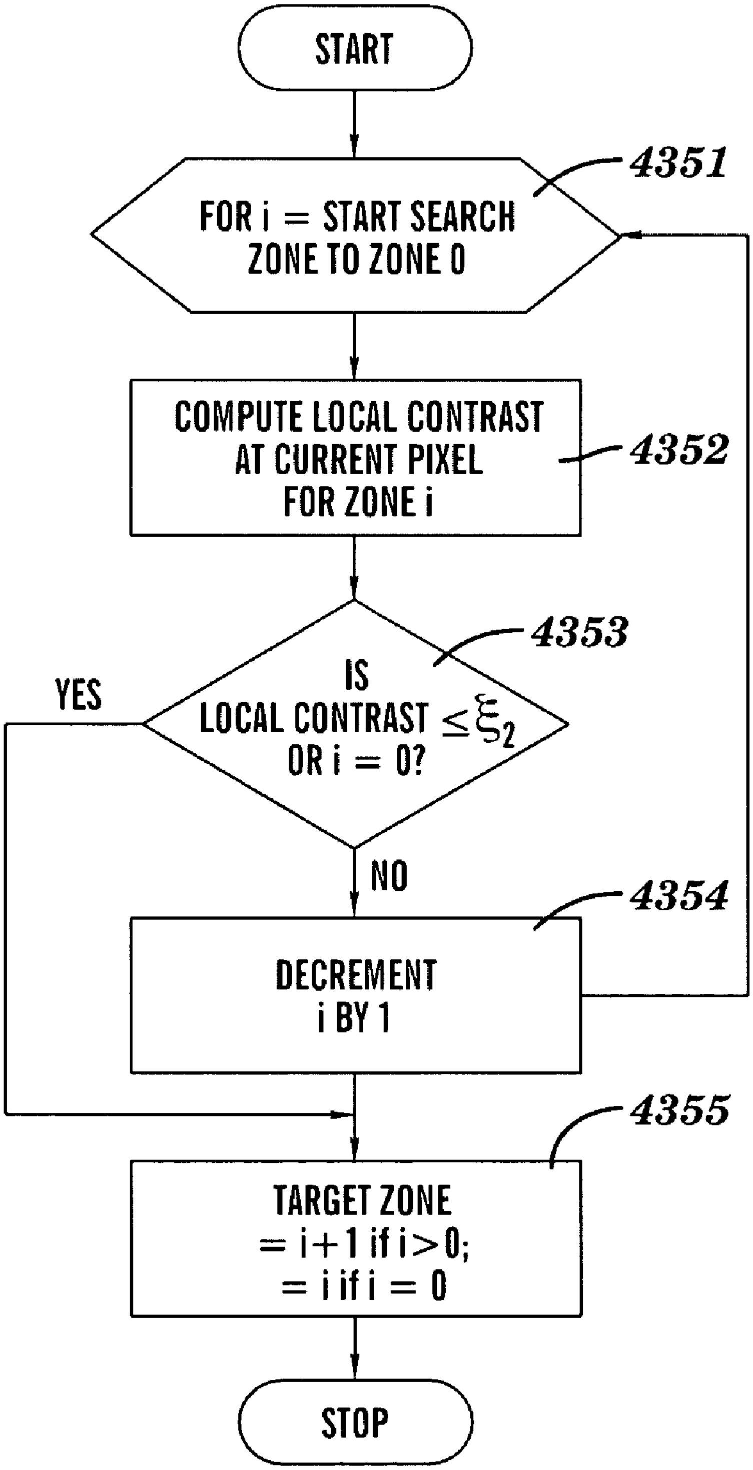
FIG. 12 is a flow chart of a process for finding the target zone by performing a downward zone search using the start search zone, in accordance with embodiments of the present invention.

Step 435 performs a downward zone search which iteratively decrements the search zone by one (1) until a stopping criterion is satisfied, as described in detail in FIG. 12.

The algorithms in FIGS. 10-12 compute a two-dimensional convolution $V_{i1}(x,y)$ of the scaled luminance $l_i(x,y)$ at the current pixel P(x,y) for zone i. The convolution $V_{i1}(x,y)$ is between the scaled pixel luminance $l_i(x,y)$ in zone i and the convolution kernel $k_i(x,y)$ of zone i. The preceding convolution $V_{i1}(x,y)$ is expressed symbolically as $V_{i1}(x,y)=l_i(x,y)\otimes k_i(x,y)$.

The algorithms in FIGS. 10-12 also compute a two-dimensional convolution $V_{i2}(x,y)$ of the scaled luminance $l_i(x,y)$ at the current pixel P(x,y) for zone i. The convolution $V_{i2}(x,y)$ is between the scaled pixel luminance $l_i(x,y)$ in zone i and the convolution kernel $k_{i+1}(x,y)$ of zone i+1 (i.e., the portion of the convolution kernel $k_{i+1}(x,y)$ of zone i+1 that is in zone i)

The preceding convolution $V_{i2}(x,y)$ is expressed symbolically as $V_{i2}(x,y)=l_i(x,y)\otimes k_{i+1}(x,y)$.

The present invention uses the following expression for the convolution kernel $k_i(x,y)$:

$$k_i(x,y)=(1/(\pi a(L_i-1)/2)^2)\exp(-((x^2+y^2)/(a(L_i-1)/2)^2))$$

wherein r is the number of zones and $a=1/(2\sqrt{2})$.

The convolution $V_{i1}(x,y)$ or $V_{i2}(x,y)$ at the current pixel P(x,y) for zone i is a weighted average of the values for the luminance l(x,y) in zone i around the current pixel P(x,y). The convolution kernel is represented as a two-dimensional matrix. The size of the matrix is determined so that the zone border pixels furthest from the current pixel P(x,y) have very small kernel values.

A two-dimensional convolution and its computation is known in the art and any such computation may be used to compute $V_{i1}(x,y)$ or $V_{i2}(x,y)$, given $l_i(x,y)$, $k_i(x,y)$, and $k_{i+1}(x,y)$. For example, a convolution V(x,y) between a function F(x,y) and a kernel K(x,y) for a n×n zone of pixels centered at pixel P(x,y) may be computed via:

$$V(x, y) = F(x, y) \otimes K(x, y) = \sum_{i=x-\lfloor n/2 \rfloor}^{x+\lceil n/2 \rceil -1} \sum_{j=y-\lfloor n/2 \rfloor}^{y+\lceil n/2 \rceil -1} F(i, j) \cdot K(|x-i|, |y-j|)$$

The lower and upper limits for i and j in the summation (Σ) over i and j in the preceding formula for V(x,y) is correct for n even and is modified as follows for n odd. For n odd, the summation (Σ) over j is from j=y−(n−1)/2 to j=y+(n−1)/2 and the summation (Σ) over i is from i=x−(n−1)/2 to j=x+(n−1)/2.

The following references may be consulted for additional information pertaining to computation of a two-dimensional convolution: Alan V. Oppenheim and Ronald W. Schafer, "Digital Signal Processing", Prentice-Hall, Inc., pages 110-115, (1975); David A. Bader and Virat Agarwal, "FFTC: Fastest Fourier Transform for the IBM Cell Broadband Engine, HiPC, pages 172-184 (2007)."

The local contrast $\delta_i(x,y)$ at the current pixel P(x,y) with respect to zone i is given by:

$$\delta_i(x,y)=(V1-V2)/((\alpha 2^{\phi-1}/(L_i-1))+V1)$$

wherein $V1=V_{i1}(x,y)$, $V2=V_{i2}(x,y)$, r is the number of zones, and φ is the sharpening factor (default 8).

The formula for local contrast $\delta_i(x,y)$ computes a normalized difference between the average pixel luminance of a given zone i and a neighboring zone i+1.

FIG. 10 computes a local contrast at the current pixel P(x,y) using the start search zone, in accordance with embodiments of the present invention. FIG. 10 provides a detailed description of step 432 of FIG. 9. Let zone i and zone i+1 denote the start search zone and the start search zone +1, respectively.

Step 4321 computes the convolution $V1=l_i(x,y)\otimes k_i(x,y)$ at the current pixel P(x,y).

Step 4322 computes the convolution $V2=l(x,y)\otimes k_{i2}(x,y)$ at the current pixel P(x,y).

Step 4323 computes the local contrast $\delta_i(x,y)$ at the current pixel P(x,y) with respect to zone i.

Next, the zones are incrementally increased (FIG. 11) or decrementally decreased (FIG. 12) and the associated local contrasts computed and compared against a specified threshold in a search for the largest zone at which the local contrast is below a specified threshold in an upward zone search (FIG. 11) or the smallest zone such at which the local contrast is below a specified threshold in a downward zone search (FIG. 12).

FIG. 11 is a flow chart of a process for finding the target zone by performing an upward zone search using the start search zone, in accordance with embodiments of the present invention.

Step 4341 initiates performing a next iteration for a next zone i. The next zone i is the start search zone for the first instance of executing step 4341. The iterations over iteration index i are from the start search zone to the maximum zone number ($i_{max}$).

Step 4342 computes the local contrast $\delta_i(x,y)$ at the current pixel P(x,y for zone i.

Step 4343 determines if the local contrast $\delta_i(x,y)$ exceeds a specified threshold $\xi_1$ If step 4343 determines that the local contrast $\delta_i(x,y)$ exceeds the threshold $\xi_1$ or that $i=i_{max}$, then step 4345 is next executed; otherwise step 4344 increments i by 1 and loops back to step 4341 to perform the next iteration for the next zone i.

Step 4345 sets the target zone number to i−1 if i>0 or to i if i=0. Then the process of FIG. 11 stops.

FIG. 12 is a flow chart of a process for finding the target zone by performing an downward zone search using the start search zone, in accordance with embodiments of the present invention.

Step 4351 initiates performing a next iteration for a next zone i. The next zone i is the start search zone for the first instance of executing step 4351. The iterations over iteration index i are from the start search zone to zone number zero (0).

Step 4352 computes the local contrast $\delta_i(x,y)$ at the current pixel P(x,y for zone i.

Step 4353 determines if the local contrast $\delta_i(x,y)$ exceeds a specified threshold $\xi_2$ or i=0. If step 4353 determines that the local contrast $\delta_i(x,y)$ does not exceed the threshold $\xi_2$ or i=0, then step 4355 is next executed; otherwise step 4354 decrements i by 1 and loops back to step 4351 to perform the next iteration for the next zone i.

Step 4355 sets the target zone number to i+1 if i>0 or to i if i=0. Then the process of FIG. 12 stops.

The following example illustrates use of the present invention. The side $S_i$ of the square onto which the kernel $k_i$ is mapped is $L_i=\text{ceiling}(2*(1.6)^i+1)$ Thus $L_0=3$, $L_1=5$, $L_2=7$, etc.

For zone 0 (i=0) the convolution kernel, which is mapped onto the square whose side has length $L_0=3$, is:

| | | |
|---|---|---|
| 2.86568E-07 | 0.000854249 | 2.86568E-07 |
| 0.000854249 | 2.546479089 | 0.000854249 |
| .86568E-07 | 0.000854249 | 2.86568E-07 |

Assume that the pixel array is 6×6 and the image luminance at the pixels is:

| | | | | | |
|---|---|---|---|---|---|
| 0 | 0 | 0 | 0 | 0 | 0 |
| 0 | 10 | 20 | 29 | 25 | 10 |
| 0 | 20 | 30 | 40 | 40 | 30 |
| 0 | 25 | 40 | 60 | 55 | 35 |
| 0 | 21 | 20 | 19 | 9 | 9 |
| 0 | 0 | 0 | 0 | 0 | 0 |

Assume that the current pixel is the pixel whose luminance is 60 and that the last three computed zones stored in the zone history queue are (1, 2, 1). Since these three zones are not identical, an upward zone search is initiated by computing the convolution with the convolution kernel of zone 0 (even if gradient test passes). The luminosities of zone 0 are:

| | | |
|---|---|---|
| 30 | 40 | 40 |
| 40 | 60 | 55 |
| 20 | 19 | 9 |

The luminosities of zone 0 are multiplied (point to point) with the preceding convolution kernel of zone 0 and the products are summed to determine the convolution V1=152.9.

To compute the convolution at zone 1, the following 5×5 convolution kernel, which is mapped onto the square whose side is $L_1$=5, could be used:

| | | | | |
|---|---|---|---|---|
| 1.3912E−11 | 1.63572E−07 | 3.71947E−06 | 1.63572E−07 | 1.3912E−11 |
| 1.63572E−07 | 0.001923212 | 0.043732069 | 0.001923212 | 1.63572E−07 |
| 3.71947E−06 | 0.043732069 | 0.994427213 | 0.043732069 | 3.71947E−06 |
| 1.63572E−07 | 0.001923212 | 0.043732069 | 0.001923212 | 1.63572E−07 |
| 1.3912E−11 | 1.63572E−07 | 3.71947E−06 | 1.63572E−07 | 1.3912E−11 |

For computational convenience, noting that the kernel values of the outermost ring of the preceding 5×5 kernel are numerically negligible and have negligible effect on the calculated luminosity, the preceding 5×5 kernel was truncated to the following 3×3 kernel.

| | | |
|---|---|---|
| 0.001923212 | 0.043732069 | 0.001923212 |
| 0.043732069 | 0.994427213 | 0.043732069 |
| 0.001923212 | 0.043732069 | 0.001923212 |

The luminosities of zone 0 are multiplied (point to point) with the preceding convolution kernel of zone 1 and the products are summed to determine the convolution V2=66.6. The local contrast $\delta_i(x,y)$ is computed by $\delta_i(x,y)=(V1-V2)/((\alpha 2^{\Phi-1}/(L_i-1))+V1)$ as discussed supra.

wherein α=0.18 and i=0, which results in a local contrast of 0.43. Assuming a threshold of 0.5, it is determined that zone should be incremented to 1. For zone 1, V1 is equal to V2 previously computed for zone 0. Thus V1=66.6 for zone 1. To compute V2 for zone 1, the corresponding 5×5 convolution kernel at zone 2 is (after truncation, for computational convenience with negligible loss of accuracy, from a 7×7 kernel corresponding to $L_2$=7):

| | | | | |
|---|---|---|---|---|
| 2.24146E−05 | 0.000871033 | 0.002950317 | 0.000871033 | 2.24146E−05 |
| .000871033 | 0.033848333 | 0.114649347 | 0.033848333 | 0.000871033 |
| 0.002950317 | 0.114649347 | 0.388334421 | 0.114649347 | 0.002950317 |
| .000871033 | 0.033848333 | 0.114649347 | 0.033848333 | 0.000871033 |
| .24146E−05 | 0.000871033 | 0.002950317 | 0.000871033 | 2.24146E−05 |

The preceding convolution kernel is convoluted with the following luminance matrix:

| | | | | |
|---|---|---|---|---|
| 10 | 20 | 29 | 25 | 10 |
| 20 | 30 | 40 | 40 | 30 |
| 25 | 40 | 60 | 55 | 35 |
| 21 | 20 | 19 | 9 | 9 |
| 0 | 0 | 0 | 0 | 0 |

-continued which result in V2=44.7, and a local contrast of (66.6−44.7)/(0.18*2ˆ8*1.6−66.6)=3.1 which exceeds the threshold of 0.5 so that the search is stopped at zone 1. The scaled pixel luminance of 60 is now further scaled by V1=66.6, resulting in a further scaled luminance of (60/(1+66.6)=0.9. The zone history queue is updated to be (2, 1, 1).

The next pixel (with luminance value 55) in next processed. Since the last three found zones (2, 1, 1) are not identical, the zone search is upward starting from zone 0 as was done for the previous pixel with luminance 60. Assume the search is stopped at zone 1, so that the zone history queue is updated to (1, 1, 1). For the next pixel with luminance value 35, since the last three zones are identical (i.e., zone 1) and assuming that the gradient is below the threshold of 0.5, the start search zone is zone 1.

The preceding process is repeated for all pixels in the image.

Figure 13:
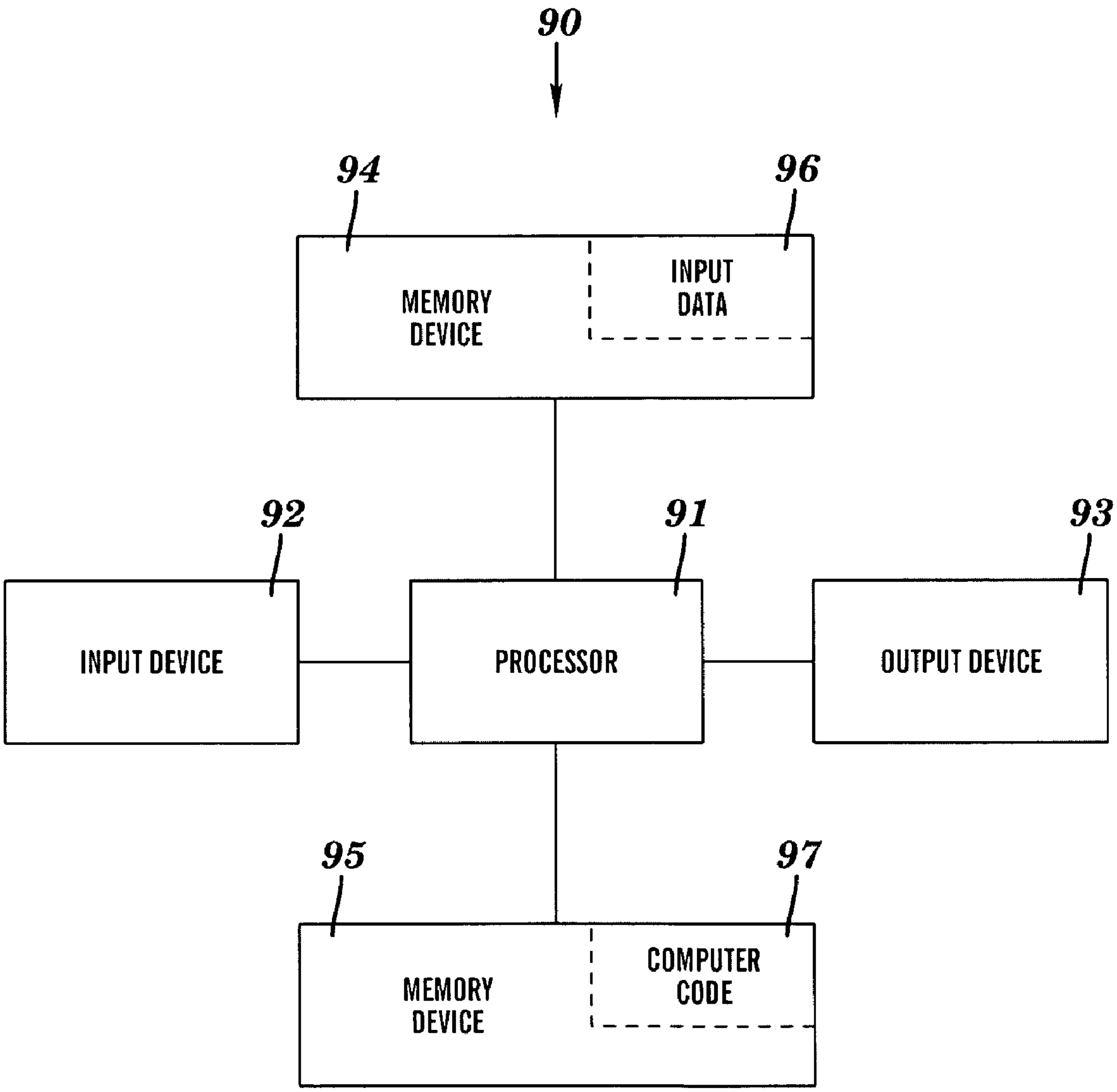
FIG. 13 illustrates a computer system used for transforming a video image from an HDR image to an LDR, in accordance with embodiments of the present invention.

FIG. 13 illustrates a computer system 90 used for transforming a video image from an HDR image to an LDR image, in accordance with embodiments of the present invention. The computer system 90 comprises a processor 91, an input device 92 coupled to the processor 91, an output device 93 coupled to the processor 91, and memory devices 94 and 95 each coupled to the processor 91. The processor 91 is a processing unit such as a central processing unit (CPU). The input device 92 may be, inter alia, a keyboard, a mouse, etc. The output device 93 may be, inter alia, a printer, a plotter, a display device (e.g., a computer screen), a magnetic tape, a removable hard disk, a floppy disk, etc. The display device may comprise the display area 10 of FIG. 1. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for transforming a video image from an HDR image to an LDR image. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for transforming a video image from a High Dynamic Range (HDR) image on an array of pixels to a Low Dynamic Range (LDR) image on the array of pixels, said array characterized by NY rows of pixels oriented in an X direction and NX columns of pixels oriented in a Y direction, said NX and NY each at least 5, said method comprising:

generating an old luminance $l_{old}(x,y)$ on the array of pixels from a color space of the HDR image, wherein x and y are indexes of pixels in the X and Y directions, respectively;

generating a scaled luminance l(x,y) for each pixel on the array of pixels according to $l(x,y)=\alpha l_{old}(x,y)/l_{image}$, wherein α is a target average luminance for the image, and wherein $l_{image}$ is a geometric luminance of the image;

segmenting the scaled luminance into S stripes subject to 1≦S≦NY, wherein each stripe consists of one row or a contiguous sequence of rows of the array of pixels;

selecting a search strategy T(x,y) for searching for a target zone Z(x,y) of N zones for a current pixel P(x,y) of each stripe such that N is at least 3, wherein the N zones are denoted as zone 0, zone 1, . . . , zone N−1, wherein the search strategy T(x,y) is either a linear search strategy or a zone history-based search strategy;

determining a start search zone of the N zones based on the selected search strategy;

determining the target zone Z(x,y) for the current pixel P(x,y) of each stripe, using the search strategy and the start search zone;

computing a convolution $V_{zone}(x,y)$ of the scaled luminance l(x,y) at the current pixel P(x,y) of each stripe using a convolution kernel $k_{zone}(x,y)$ specific to the target zone Z(x,y);

generating a tone mapped pixel luminance l'(x,y) for the current pixel P(x,y) of each stripe according to $l'(x,y)=l'(x,y)/(1+V_{zone}(x,y))$, which converts the stripes to tone-mapped luminance stripes;

collecting the tone-mapped luminance stripes to form a tone mapped luminance pixel array;

transforming the tone mapped luminance pixel array to the color space to form the LDR image; and storing, displaying, or both storing and displaying the LDR image, wherein zone i (i=1, 1, . . . , N−1) of the N zones corresponds to a square of pixels in the array of pixels, said square comprising the current pixel P(x,y) at a geometrical center of the square if i is an odd integer and offset from the geometrical center of the square by one pixel if i is an even integer, each side of the square having a length $L_i$ that is measured in pixels and is a monotonically increasing function of i subject to $L_i$≧3.

2. The method of claim 1, wherein S>1, wherein each stripe comprises about a same number of rows, and wherein said selecting the strategy T(x,y), said determining the target zone Z(x,y), said computing the convolution $V_{zone}(x,y)$, and said generating the tone mapped pixel luminance l'(x,y) are performed simultaneously for the S stripes.

3. The method of claim 1, wherein said selecting the search strategy T(x,y) for searching for a target zone Z(x,y) for each current pixel P(x,y) of each stripe comprises:

computing a luminance gradient (G) for the scaled luminance l(x,y) at the current pixel $$P(x, y) \text{via } G = \sqrt{(l(x+1, y) - l(x-1, y))^2 + (l(x, y+1) - l(x, y-1))^2};$$

ascertaining whether a first gradient condition or a second gradient condition is satisfied, wherein the first gradient condition is that G does not exceed a specified gradient threshold ϵ and a last M zones (M≧2) in a zone history queue of the computer are an identical zone, wherein the second gradient condition is selected from the group consisting of G exceeds the specified gradient threshold ϵ, the last M zones in a zone history queue of the computer are not identical, and a combination thereof, and wherein each zone of the last M zones is a zone of the N zones;

if said ascertaining ascertains that the first gradient condition is satisfied, then selecting the search strategy as the zone history-based search strategy and setting the start search zone to the identical zone;

if said ascertaining ascertains that the second gradient condition is satisfied, then selecting the search strategy as the linear search strategy and setting the start search zone to zero.

4. The method of claim 3, wherein said ascertaining ascertains that the first gradient condition is satisfied.

5. The method of claim 3, wherein if the start search zone is equal to zero then said determining the target zone comprises performing an upward zone search, otherwise said determining the target zone comprises:

computing a local contrast at the current pixel P(x,y) with respect to the start search zone;

performing the upward zone search or a downward zone search if the local contrast respect to the start search zone exceeds or does not exceed a threshold ξ, respectively.

6. The method of claim 5, wherein said performing the upward zone search comprises iterating upward on zone index i from the search zone number to N−1, each iteration of said iterating upward comprising: computing a local contrast $\delta_i(x,y)$ at the current pixel P(x,y) with respect to zone i; and if $\delta_i(x,y)$ does not exceed a specified threshold $\xi_1$ then incrementing i by 1 followed by looping back to said computing $\delta_i(x,y)$, otherwise setting the target zone to i−1 if i>0 or to i if i=0;

wherein said performing the downward zone search comprises iterating downward on zone index i from the search zone number to 0, each iteration of said iterating downward comprising: computing a local contrast $\delta_i(x, y)$ at the current pixel P(x,y) with respect to zone i; and if $\delta_i(x,y)$ exceeds a specified threshold $\xi_2$ then decrementing i by 1 followed by looping back to said computing $\delta_i(x,y)$, otherwise setting the target zone to i+1 if i>0 or to i if i=0.

7. The method of claim 6, wherein said computing the local contrast $\delta_i(x,y)$ comprises:

computing a convolution V1, at the current pixel P(x,y), between the scaled luminance $l_i(x,y)$ in zone i and a convolution kernel $k_i(x,y)$ of zone i;

computing a convolution V2, at the current pixel P(x,y), between the scaled luminance $l_i(x,y)$ in zone i and a convolution kernel $k_{i+1}(x,y)$ of zone i+1; and computing $\delta_i(x,y)$ according to: $\delta_i(x,y)=(V1-V2)/((\alpha 2^{\Phi-1}/(L_i-1))+V1)$, wherein $\alpha$ is a target average luminance for the image, r is a total number of zones, and $\phi$ is a sharpening factor.

8. The method of claim 7, wherein $k_i(x,y)=(1/(\pi a(L_i-1)/2)^2) \exp(-((x^2+y^2)/(a(L_i-1)/2)^2))$, and wherein $a=1/(2\sqrt{2})$.

9. The method of claim 1, wherein $L_i$=ceiling($2*(1.6)^i+1$), and wherein ceiling($2*(1.6)^i+1$) is a smallest integer greater than or equal to $2*(1.6)^i+1$.

10. A computer usable storage medium having a computer readable program code stored therein, said storage medium not being a signal, said computer readable program code comprising instructions that when executed by a processing unit of a computer system implement a method for transforming a video image from a High Dynamic Range (HDR) image on an array of pixels to a Low Dynamic Range (LDR) image on the array of pixels, said array characterized by NY rows of pixels oriented in an X direction and NX columns of pixels oriented in a Y direction, said NX and NY each at least 5, said method comprising:

generating an old luminance $l_{old}(x,y)$ on the array of pixels from a color space of the HDR image, wherein x and y are indexes of pixels in the X and Y directions, respectively;

generating a scaled luminance l(x,y) for each pixel on the array of pixels according to $l(x,y)=\alpha l_{old}(x,y)/l_{image}$, wherein $\alpha$ is a target average luminance for the image, and wherein $l_{image}$ is a geometric luminance of the image;

segmenting the scaled luminance into S stripes subject to $1 \leqq S \leqq NY$, wherein each stripe consists of one row or a contiguous sequence of rows of the array of pixels;

selecting a search strategy T(x,y) for searching for a target zone Z(x,y) of N zones for a current pixel P(x,y) of each stripe such that N is at least 3, wherein the N zones are denoted as zone 0, zone 1, . . . , zone N−1, wherein the search strategy T(x,y) is either a linear search strategy or a zone history-based search strategy;

determining a start search zone of the N zones based on the selected search strategy;

determining the target zone Z(x,y) for the current pixel P(x,y) of each stripe, using the search strategy and the start search zone;

computing a convolution $V_{zone}(x,y)$ of the scaled luminance l(x,y) at the current pixel P(x,y) of each stripe using a convolution kernel $k_{zone}(x,y)$ specific to the target zone Z(x,y);

generating a tone mapped pixel luminance l'(x,y) for the current pixel P(x,y) of each stripe according to $l'(x,y)=l'(x,y)/(1+V_{zone}(x,y))$, which converts the stripes to tone-mapped luminance stripes;

collecting the tone-mapped luminance stripes to form a tone mapped luminance pixel array;

transforming the tone mapped luminance pixel array to the color space to form the LDR image; and storing, displaying, or both storing and displaying the LDR image, wherein zone i (i=1, 1, . . . , N−1) of the N zones corresponds to a square of pixels in the array of pixels, said square comprising the current pixel P(x,y) at a geometrical center of the square if i is an odd integer and offset from the geometrical center of the square by one pixel if i is an even integer, each side of the square having a length $L_i$ that is measured in pixels and is a monotonically increasing function of i subject to $L_i \geqq 3$.

11. The storage medium of claim 10, wherein S>1, wherein each stripe comprises about a same number of rows, and wherein said selecting the strategy T(x,y), said determining the target zone Z(x,y), said computing the convolution $V_{zone}(x,y)$, and said generating the tone mapped pixel luminance l'(x,y) are performed simultaneously for the S stripes.

12. The storage medium of claim 10, wherein said selecting the search strategy T(x,y) for searching for a target zone Z(x,y) for each current pixel P(x,y) of each stripe comprises:

computing a luminance gradient (G) for the scaled luminance l(x,y) at the current pixel $$P(x, y) \text{via } G = \sqrt{(l(x+1, y) - l(x-1, y))^2 + (l(x, y+1) - l(x, y-1))^2};$$

ascertaining whether a first gradient condition or a second gradient condition is satisfied, wherein the first gradient condition is that G does not exceed a specified gradient threshold $\epsilon$ and a last M zones ($M \geqq 2$) in a zone history queue of the computer are an identical zone, wherein the second gradient condition is selected from the group consisting of G exceeds the specified gradient threshold $\epsilon$, the last M zones in a zone history queue of the computer are not identical, and a combination thereof, and wherein each zone of the last M zones is a zone of the N zones;

if said ascertaining ascertains that the first gradient condition is satisfied, then selecting the search strategy as the zone history-based search strategy and setting the start search zone to the identical zone;

if said ascertaining ascertains that the second gradient condition is satisfied, then selecting the search strategy as the linear search strategy and setting the start search zone to zero.

13. The storage medium of claim 12, wherein said ascertaining ascertains that the first gradient condition is satisfied.

14. The storage medium of claim 12, wherein if the start search zone is equal to zero then said determining the target zone comprises performing an upward zone search, otherwise said determining the target zone comprises:

computing a local contrast at the current pixel P(x,y) with respect to the start search zone;

performing the upward zone search or a downward zone search if the local contrast respect to the start search zone exceeds or does not exceed a threshold $\xi$, respectively.

15. The storage medium of claim 14, wherein said performing the upward zone search comprises iterating upward on zone index i from the search zone number to N−1, each iteration of said iterating upward comprising: computing a local contrast $\delta_i(x,y)$ at the current pixel P(x,y) with respect to zone i; and if $\delta_i(x,y)$ does not exceed a specified threshold $\xi_1$ then incrementing i by 1 followed by looping back to said computing $\delta_i(x,y)$, otherwise setting the target zone to i−1 if i>0 or to i if i=0;

wherein said performing the downward zone search comprises iterating downward on zone index i from the search zone number to 0, each iteration of said iterating downward comprising: computing a local contrast $\delta_i(x,y)$ at the current pixel P(x,y) with respect to zone i; and if $\delta_i(x,y)$ exceeds a specified threshold $\xi_2$ then decrementing i by 1 followed by looping back to said computing $\delta_i(x,y)$, otherwise setting the target zone to i+1 if i>0 or to i if i=0.

16. A computer system comprising a processing unit and a computer readable memory unit coupled to the processing unit, said memory unit containing instructions that when executed by the processing unit implement a method for transforming a video image from a High Dynamic Range (HDR) image on an array of pixels to a Low Dynamic Range (LDR) image on the array of pixels, said array characterized by NY rows of pixels oriented in an X direction and NX columns of pixels oriented in a Y direction, said NX and NY each at least 5, said method comprising:

generating an old luminance $l_{old}(x,y)$ on the array of pixels from a color space of the HDR image, wherein x and y are indexes of pixels in the X and Y directions, respectively;

generating a scaled luminance l(x,y) for each pixel on the array of pixels according to $l(x,y)=\alpha l_{old}(x,y)/l_{image}$, wherein $\alpha$ is a target average luminance for the image, and wherein $l_{image}$ is a geometric luminance of the image;

segmenting the scaled luminance into S stripes subject to $1 \leqq S \leqq NY$, wherein each stripe consists of one row or a contiguous sequence of rows of the array of pixels;

selecting a search strategy T(x,y) for searching for a target zone Z(x,y) of N zones for a current pixel P(x,y) of each stripe such that N is at least 3, wherein the N zones are denoted as zone 0, zone 1, . . . , zone N−1, wherein the search strategy T(x,y) is either a linear search strategy or a zone history-based search strategy;

determining a start search zone of the N zones based on the selected search strategy;

determining the target zone Z(x,y) for the current pixel P(x,y) of each stripe, using the search strategy and the start search zone;

computing a convolution $V_{zone}(x,y)$ of the scaled luminance l(x,y) at the current pixel P(x,y) of each stripe using a convolution kernel $k_{zone}(x,y)$ specific to the target zone Z(x,y);

generating a tone mapped pixel luminance l'(x,y) for the current pixel P(x,y) of each stripe according to $l'(x,y)=l'(x,y)/(1+V_{zone}(x,y))$, which converts the stripes to tone-mapped luminance stripes;

collecting the tone-mapped luminance stripes to form a tone mapped luminance pixel array;

transforming the tone mapped luminance pixel array to the color space to form the LDR image; and storing, displaying, or both storing and displaying the LDR image, wherein zone i (i=1, 1, . . . , N−1) of the N zones corresponds to a square of pixels in the array of pixels, said square comprising the current pixel P(x,y) at a geometrical center of the square if i is an odd integer and offset from the geometrical center of the square by one pixel if i is an even integer, each side of the square having a length $L_i$ that is measured in pixels and is a monotonically increasing function of i subject to $L_i \geqq 3$.

17. The computer system claim 16, wherein S>1, wherein each stripe comprises about a same number of rows, and wherein said selecting the strategy T(x,y), said determining the target zone Z(x,y), said computing the convolution $V_{zone}(x,y)$, and said generating the tone mapped pixel luminance l'(x,y) are performed simultaneously for the S stripes.

18. The computer system claim 16, wherein said selecting the search strategy T(x,y) for searching for a target zone Z(x,y) for each current pixel P(x,y) of each stripe comprises:

computing a luminance gradient (G) for the scaled luminance l(x,y) at the current pixel $$P(x, y) \text{via } G = \sqrt{(l(x+1, y) - l(x-1, y))^2 + (l(x, y+1) - l(x, y-1))^2};$$

ascertaining whether a first gradient condition or a second gradient condition is satisfied, wherein the first gradient condition is that G does not exceed a specified gradient threshold $\epsilon$ and a last M zones ($M \geqq 2$) in a zone history queue of the computer are an identical zone, wherein the second gradient condition is selected from the group consisting of G exceeds the specified gradient threshold $\epsilon$, the last M zones in a zone history queue of the computer are not identical, and a combination thereof, and wherein each zone of the last M zones is a zone of the N zones;

if said ascertaining ascertains that the first gradient condition is satisfied, then selecting the search strategy as the zone history-based search strategy and setting the start search zone to the identical zone;

if said ascertaining ascertains that the second gradient condition is satisfied, then selecting the search strategy as the linear search strategy and setting the start search zone to zero.

19. The computer system claim 18, wherein said ascertaining ascertains that the first gradient condition is satisfied.

20. The computer system claim 18, wherein if the start search zone is equal to zero then said determining the target zone comprises performing an upward zone search, otherwise said determining the target zone comprises:

computing a local contrast at the current pixel P(x,y) with respect to the start search zone;

performing the upward zone search or a downward zone search if the local contrast respect to the start search zone exceeds or does not exceed a threshold $\xi$, respectively.

21. The computer system claim 20, wherein said performing the upward zone search comprises iterating upward on zone index i from the search zone number to N−1, each iteration of said iterating upward comprising: computing a local contrast $\delta_i(x,y)$ at the current pixel P(x,y) with respect to zone i; and if $\delta_i(x,y)$ does not exceed a specified threshold $\xi_1$ then incrementing i by 1 followed by looping back to said computing $\delta_i(x,y)$, otherwise setting the target zone to i−1 if i>0 or to i if i=0;

wherein said performing the downward zone search comprises iterating downward on zone index i from the search zone number to 0, each iteration of said iterating downward comprising: computing a local contrast $\delta_i(x, y)$ at the current pixel P(x,y) with respect to zone i; and if $\delta_i(x,y)$ exceeds a specified threshold $\xi_2$ then decrementing i by 1 followed by looping back to said computing $\delta_i(x,y)$, otherwise setting the target zone to i+1 if i>0 or to i if i=0.

* * * * *